(12) United States Patent
Li et al.

(10) Patent No.: US 10,476,721 B2
(45) Date of Patent: Nov. 12, 2019

(54) INFORMATION TRANSMISSION METHOD, DEVICE, AND SYSTEM USING DCI CONFIGURATION

(71) Applicant: Huawei Technologies Co., Ltd., Shenzhen (CN)

(72) Inventors: Xiaocui Li, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 15/541,675

(22) PCT Filed: Jan. 5, 2015

(86) PCT No.: PCT/CN2015/070132
§ 371 (c)(1),
(2) Date: Jul. 5, 2017

(87) PCT Pub. No.: WO2016/109926
PCT Pub. Date: Jul. 14, 2016

(65) Prior Publication Data
US 2018/0006863 A1    Jan. 4, 2018

(51) Int. Cl.
*H04L 27/26* (2006.01)
*H04L 29/06* (2006.01)
(Continued)

(52) U.S. Cl.
CPC ........ *H04L 27/2646* (2013.01); *H04L 1/0038* (2013.01); *H04L 5/0092* (2013.01); *H04L 29/06* (2013.01); *H04W 72/042* (2013.01)

(58) Field of Classification Search
CPC ..... H04L 27/26; H04L 29/06; H04L 27/2646; H04L 5/0092; H04L 1/0038; H04W 72/04; H04W 72/042
See application file for complete search history.

(56) References Cited

U.S. PATENT DOCUMENTS

2009/0109915 A1    4/2009  Pasad et al.
2010/0027447 A1    2/2010  Choi et al.
(Continued)

FOREIGN PATENT DOCUMENTS

CN    201286174 Y    8/2009
CN    103780334 A    5/2014
(Continued)

OTHER PUBLICATIONS

Hiramaya et al.,"Performance of downlink control information signals using decision-feedback channel estimation for EPDCCH," 2014 IEEE International Conference on Communication Systems, pp. 625-629, Institute of Electrical and Electronics Engineers—New York, New York (2014).

*Primary Examiner* — Kyaw Z Soe
(74) *Attorney, Agent, or Firm* — Leydig, Voit & Mayer, Ltd.

(57) ABSTRACT

The present invention discloses an information transmission method, a device, and a system, and relates to the communications field, so as to resolve a problem that a receiving device has excessively large power consumption because the receiving device needs to continuously perform blind detection on a channel to determine a moment at which data transmission is started. A specific solution is: obtaining, by a network device, a start location of a first subframe, configuring a first field in downlink control information DCI of a second subframe, and sending, to user equipment, the first subframe and the second subframe that are adjacent to each other, where the first field is used to indicate the start location of the first subframe. The present invention is used for information transmission.

9 Claims, 4 Drawing Sheets

(51) Int. Cl.
*H04W 72/04* (2009.01)
*H04L 1/00* (2006.01)
*H04L 5/00* (2006.01)

(56) References Cited

U.S. PATENT DOCUMENTS

| | | | |
|---|---|---|---|
| 2010/0325506 A1* | 12/2010 | Cai | H04W 72/042 |
| | | | 714/748 |
| 2012/0320782 A1 | 12/2012 | Seo et al. | |
| 2014/0050206 A1* | 2/2014 | Seo | H04J 11/0069 |
| | | | 370/336 |
| 2015/0245323 A1* | 8/2015 | You | H04W 72/042 |
| | | | 370/329 |
| 2016/0353420 A1* | 12/2016 | You | H04L 5/0053 |
| 2018/0048437 A1 | 2/2018 | Seo et al. | |

FOREIGN PATENT DOCUMENTS

| | | |
|---|---|---|
| CN | 103875202 A | 6/2014 |
| CN | 103916228 A | 7/2014 |
| CN | 104144031 A | 11/2014 |

\* cited by examiner

INFORMATION TRANSMISSION METHOD, DEVICE, AND SYSTEM USING DCI CONFIGURATION

CROSS-REFERENCE TO RELATED APPLICATIONS

This application is a national stage of International Application No. PCT/CN2015/070132, filed on Jan. 5, 2015, which is hereby incorporated by reference in its entirety.

TECHNICAL FIELD

The present invention relates to the communications field, and in particular, to an information transmission method, a device, and a system.

BACKGROUND

In a wireless communications network, each device needs to transmit information by using a frequency resource. The frequency resource is also referred to as a spectrum. Spectra may be classified into a licensed spectrum and an unlicensed spectrum. The licensed spectrum is a dedicated frequency resource of some operators, and the unlicensed spectrum is a shared frequency resource in the wireless communications network. With development of communications technologies, there is an ever-increasing amount of information transmitted in the wireless communications network. Preemption of the unlicensed spectrum for information transmission may increase a data throughput in the wireless communications network to better meet a requirement of a user.

However, in the prior art, after a device successfully preempts a channel of the unlicensed spectrum, because a data sending moment may be random, a moment for sending data by the device may not be a starting moment of a complete subframe. In this way, a receiving device needs to continuously perform blind detection on the channel to determine a moment at which data transmission is started. As a result, the receiving device has excessively large power consumption.

SUMMARY

Embodiments of the present invention provide an information transmission method, a device, and a system, so as to resolve a problem that a receiving device has excessively large power consumption because without knowing a location of a start OFDM symbol of a first subframe, the receiving device needs to continuously perform blind detection on a channel to determine a moment at which data transmission is started.

To achieve the foregoing objective, the following technical solutions are used in the embodiments of the present invention:

According to a first aspect, the present invention provides an information transmission method, including:

obtaining, by a network device, a start location of a first subframe;

configuring, by the network device, a first field in downlink control information DCI of a second subframe, where the first field is used to indicate the start location of the first subframe; and sending, by the network device to user equipment, the first subframe and the second subframe that are adjacent to each other, where the second subframe is sent after the first subframe, the first subframe includes M orthogonal frequency division multiplexing OFDM symbols, the second subframe includes N OFDM symbols, M and N are positive integers, and M≤N, where the start location of the first subframe is a location or a range of a location of a first OFDM symbol of the first subframe sent by the network device to the user equipment.

With reference to the first aspect, in a first possible implementation of the first aspect, when the first subframe does not include DCI of the user equipment, the first field is used to indicate the start orthogonal frequency division multiplexing OFDM symbol of the first subframe that is sent first or a range of the start OFDM symbol of the first subframe that is sent first.

With reference to the first aspect or the first possible implementation of the first aspect, in a second possible implementation of the first aspect, all or some bits of the first field are used to indicate the start orthogonal frequency division multiplexing OFDM symbol of the first subframe that is sent first or the range of the start OFDM symbol of the first subframe that is sent first.

With reference to the first aspect or the first possible implementation of the first aspect, in a third possible implementation of the first aspect, all or some values of the first field are used to indicate the start orthogonal frequency division multiplexing OFDM symbol of the first subframe that is sent first or the range of the start OFDM symbol of the first subframe that is sent first.

With reference to any one of the first aspect to the third possible implementation of the first aspect, in a fourth possible implementation of the first aspect, the first field is a newly added field or an original field in the DCI.

With reference to any one of the first aspect to the fourth possible implementation of the first aspect, in a fifth possible implementation of the first aspect, when the first field is an original field in the DCI, the first field is a redundancy version RV field, a carrier indicator field CIF, a resource allocation RA field, a modulation and coding scheme MCS field, a downlink assignment index DAI field, a sounding reference signal SRS request field, a transmitted precoding matrix indicator TPMI acknowledgement field, a precoding matrix indicator PMI acknowledgement field, a downlink power offset field, a hybrid automatic repeat request HARQ process quantity field, a transport block to codeword swap flag field, a precoding information field, a transmit power control TPC field, a scrambling identity field, an antenna port, number of layers, and reference signal scrambling sequence field, a physical downlink shared channel PDSCH resource element RE mapping and quasi-co-location indicator field, a demodulation reference signal DMRS cyclic shift and orthogonal cover code OCC index field, an uplink index ULI field, a downlink assignment index DAI field, a channel state information CSI request field, an indicator field in a DCI format 3, or an indicator field in a DCI format 3A.

With reference to the fifth possible implementation of the first aspect, in a sixth possible implementation of the first aspect, the first field is further used to indicate a meaning of the original field in the DCI.

With reference to the sixth possible implementation of the first aspect, in a seventh possible implementation of the first aspect, the first subframe is a subframe of an unlicensed carrier.

According to a second aspect, the present invention provides an information transmission method, including:

receiving, by user equipment, a first subframe and a second subframe that are adjacent to each other and that are sent by a network device, where the second subframe is received after the first subframe, the first subframe includes M orthogonal frequency division multiplexing OFDM symbols, the second subframe includes N OFDM symbols, M and N are positive integers, and M≤N;

obtaining, by the user equipment, a start location of the first subframe from a first field in downlink control information DCI of the second subframe; and processing, by the user equipment starting from the start location of the first subframe, the first subframe, where the start location of the first subframe is a location or a range of a location of the first OFDM symbol of the first subframe sent by the network device to the user equipment.

With reference to the second aspect, in a first possible implementation of the second aspect, when the first subframe does not include DCI of the user equipment, the first field is used to indicate the start orthogonal frequency division multiplexing OFDM symbol of the first subframe that is sent first or a range of the start OFDM symbol of the first subframe that is sent first.

With reference to the second aspect or the first possible implementation of the second aspect, in a second possible implementation of the second aspect, all or some bits of the first field are used to indicate the start orthogonal frequency division multiplexing OFDM symbol of the first subframe that is sent first or the range of the start OFDM symbol of the first subframe that is sent first.

With reference to the second aspect or the first possible implementation of the second aspect, in a third possible implementation of the second aspect, all or some values of the first field are used to indicate the start orthogonal frequency division multiplexing OFDM symbol of the first subframe that is sent first or the range of the start OFDM symbol of the first subframe that is sent first.

With reference to any one of the second aspect to the third possible implementation of the second aspect, in a fourth possible implementation of the second aspect, the first field is a newly added field or an original field in the DCI.

With reference to any one of the second aspect to the fourth possible implementation of the second aspect, in a fifth possible implementation of the second aspect, when the first field is an original field in the DCI, the first field is a redundancy version RV field, a carrier indicator field CIF, a resource allocation RA field, a modulation and coding scheme MCS field, a downlink assignment index DAI field, a sounding reference signal SRS request field, a transmitted precoding matrix indicator TPMI acknowledgement field, a precoding matrix indicator PMI acknowledgement field, a downlink power offset field, a hybrid automatic repeat request HARQ process quantity field, a transport block to codeword swap flag field, a precoding information field, a transmit power control TPC field, a scrambling identity field, an antenna port, number of layers, and reference signal scrambling sequence field, a physical downlink shared channel PDSCH resource element RE mapping and quasi-co-location indicator field, a demodulation reference signal DMRS cyclic shift and orthogonal cover code OCC index field, an uplink index ULI field, a downlink assignment index DAI field, a channel state information CSI request field, an indicator field in a DCI format 3, or an indicator field in a DCI format 3A.

With reference to the fifth possible implementation of the second aspect, in a sixth possible implementation of the second aspect, the first field is further used to indicate a meaning of the original field in the DCI.

With reference to the sixth possible implementation of the second aspect, in a seventh possible implementation of the second aspect, the first subframe is a subframe of an unlicensed carrier.

According to a third aspect, an embodiment of the present invention provides a network device, including:

an obtaining unit, configured to obtain a start location of a first subframe;

a configuration unit, configured to configure a first field in downlink control information DCI of a second subframe, where the first field is used to indicate the start location of the first subframe that is obtained by the obtaining unit; and a sending unit, configured to send, to user equipment, the first subframe and the second subframe that are adjacent to each other, where the second subframe is sent after the first subframe, the first subframe includes M orthogonal frequency division multiplexing OFDM symbols, the second subframe includes N OFDM symbols, M and N are positive integers, and M≤N, where the start location of the first subframe is a location or a range of a location of the first OFDM symbol of the first subframe sent by the network device to the user equipment.

With reference to the third aspect, in a first possible implementation of the third aspect, when the first subframe does not include DCI of the user equipment, the first field is used to indicate the start orthogonal frequency division multiplexing OFDM symbol of the first subframe that is sent first or a range of the start OFDM symbol of the first subframe that is sent first.

With reference to the third aspect or the first possible implementation of the third aspect, in a second possible implementation of the third aspect, all or some bits of the first field are used to indicate the start orthogonal frequency division multiplexing OFDM symbol of the first subframe that is sent first or the range of the start OFDM symbol of the first subframe that is sent first.

With reference to the third aspect or the first possible implementation of the third aspect, in a third possible implementation of the third aspect, all or some values of the first field are used to indicate the start orthogonal frequency division multiplexing OFDM symbol of the first subframe that is sent first or the range of the start OFDM symbol of the first subframe that is sent first.

With reference to any one of the third aspect to the third possible implementation of the third aspect, in a fourth possible implementation of the third aspect, the first field is a newly added field or an original field in the DCI.

With reference to any one of the third aspect to the fourth possible implementation of the third aspect, in a fifth possible implementation of the third aspect, when the first field is an original field in the DCI, the first field is a redundancy version RV field, a carrier indicator field CIF, a resource allocation RA field, a modulation and coding scheme MCS field, a downlink assignment index DAI field, a sounding reference signal SRS request field, a transmitted precoding matrix indicator TPMI acknowledgement field, a precoding matrix indicator PMI acknowledgement field, a downlink power offset field, a hybrid automatic repeat request HARQ process quantity field, a transport block to codeword swap flag field, a precoding information field, a transmit power control TPC field, a scrambling identity field, an antenna port, number of layers, and reference signal scrambling sequence field, a physical downlink shared channel PDSCH resource element RE mapping and quasi-co-location indicator field, a demodulation reference signal DMRS cyclic shift and orthogonal cover code OCC index field, an uplink index ULI field, a downlink assignment index DAI field, a channel state information CSI request field, an indicator field in a DCI format 3, or an indicator field in a DCI format 3A.

With reference to the fifth possible implementation of the third aspect, in a sixth possible implementation of the third aspect, the first field is further used to indicate a meaning of the original field in the DCI.

With reference to the sixth possible implementation of the third aspect, in a seventh possible implementation of the third aspect, the first subframe is a subframe of an unlicensed carrier.

According to a fourth aspect, an embodiment of the present invention provides user equipment, including:

a receiving unit, configured to receive a first subframe and a second subframe that are adjacent to each other and that are sent by a network device, where the second subframe is received after the first subframe, the first subframe includes M orthogonal frequency division multiplexing OFDM symbols, the second subframe includes N OFDM symbols, M and N are positive integers, and M≤N;

an obtaining unit, configured to obtain a start location of the first subframe from a first field in downlink control information DCI of the second subframe received by the receiving unit; and a processing unit, configured to process, starting from the start location of the first subframe, the first subframe, where the start location of the first subframe is a location or a range of a location of the first OFDM symbol of the first subframe sent by the network device to the user equipment.

With reference to the fourth aspect, in a first possible implementation of the fourth aspect, when the first subframe does not include DCI of the user equipment, the first field is used to indicate the start orthogonal frequency division multiplexing OFDM symbol of the first subframe that is sent first or a range of the start OFDM symbol of the first subframe that is sent first.

With reference to the fourth aspect or the first possible implementation of the fourth aspect, in a second possible implementation of the fourth aspect, all or some bits of the first field are used to indicate the start orthogonal frequency division multiplexing OFDM symbol of the first subframe that is sent first or the range of the start OFDM symbol of the first subframe that is sent first.

With reference to the fourth aspect or the first possible implementation of the fourth aspect, in a third possible implementation of the fourth aspect, all or some values of the first field are used to indicate the start orthogonal frequency division multiplexing OFDM symbol of the first subframe that is sent first or the range of the start OFDM symbol of the first subframe that is sent first.

With reference to any one of the fourth aspect to the third possible implementation of the fourth aspect, in a fourth possible implementation of the fourth aspect, the first field is a newly added field or an original field in the DCI.

With reference to any one of the fourth aspect to the fourth possible implementation of the fourth aspect, in a fifth possible implementation of the fourth aspect, when the first field is an original field in the DCI, the first field is a redundancy version RV field, a carrier indicator field CIF, a resource allocation RA field, a modulation and coding scheme MCS field, a downlink assignment index DAI field, a sounding reference signal SRS request field, a transmitted precoding matrix indicator TPMI acknowledgement field, a precoding matrix indicator PMI acknowledgement field, a downlink power offset field, a hybrid automatic repeat request HARQ process quantity field, a transport block to codeword swap flag field, a precoding information field, a transmit power control TPC field, a scrambling identity field, an antenna port, number of layers, and reference signal scrambling sequence field, a physical downlink shared channel PDSCH resource element RE mapping and quasi-co-location indicator field, a demodulation reference signal DMRS cyclic shift and orthogonal cover code OCC index field, an uplink index ULI field, a downlink assignment index DAI field, a channel state information CSI request field, an indicator field in a DCI format 3, or an indicator field in a DCI format 3A.

With reference to the fifth possible implementation of the fourth aspect, in a sixth possible implementation of the fourth aspect, the first field is further used to indicate a meaning of the original field in the DCI.

With reference to the sixth possible implementation of the fourth aspect, in a seventh possible implementation of the fourth aspect, the first subframe is a subframe of an unlicensed carrier.

According to a fifth aspect, an embodiment of the present invention provides a network device, including a processor, a memory, a bus, and a transmitter, where the processor, the memory, and the transmitter are mutually connected by using the bus;

the processor is configured to obtain a start location of a first subframe, and configure a first field in downlink control information DCI of a second subframe, where the first field is used to indicate the start location of the first subframe; and the transmitter is configured to send, to user equipment, the first subframe and the second subframe that are adjacent to each other, where the second subframe is sent after the first subframe, the first subframe includes M orthogonal frequency division multiplexing OFDM symbols, the second subframe includes N OFDM symbols, M and N are positive integers, and M≤N, where the start location of the first subframe is a location or a range of a location of the first OFDM symbol of the first subframe sent by the network device to the user equipment.

With reference to the fifth aspect, in a first possible implementation of the fifth aspect, when the first subframe does not include DCI of the user equipment, the first field is used to indicate the start orthogonal frequency division multiplexing OFDM symbol of the first subframe that is sent first or a range of the start OFDM symbol of the first subframe that is sent first.

With reference to the fifth aspect or the first possible implementation of the fifth aspect, in a second possible implementation of the fifth aspect, all or some bits of the first field are used to indicate the start orthogonal frequency division multiplexing OFDM symbol of the first subframe that is sent first or the range of the start OFDM symbol of the first subframe that is sent first.

With reference to the fifth aspect or the first possible implementation of the fifth aspect, in a third possible implementation of the fifth aspect, all or some values of the first field are used to indicate the start orthogonal frequency division multiplexing OFDM symbol of the first subframe that is sent first or the range of the start OFDM symbol of the first subframe that is sent first.

With reference to any one of the fifth aspect to the third possible implementation of the fifth aspect, in a fourth possible implementation of the fifth aspect, the first field is a newly added field or an original field in the DCI.

With reference to any one of the fifth aspect to the fourth possible implementation of the fifth aspect, in a fifth possible implementation of the fifth aspect, when the first field is an original field in the DCI, the first field is a redundancy version RV field, a carrier indicator field CIF, a resource allocation RA field, a modulation and coding scheme MCS field, a downlink assignment index DAI field, a sounding reference signal SRS request field, a transmitted precoding matrix indicator TPMI acknowledgement field, a precoding matrix indicator PMI acknowledgement field, a downlink power offset field, a hybrid automatic repeat request HARQ process quantity field, a transport block to codeword swap flag field, a precoding information field, a transmit power control TPC field, a scrambling identity field, an antenna port, number of layers, and reference signal scrambling sequence field, a physical downlink shared channel PDSCH resource element RE mapping and quasi-co-location indicator field, a demodulation reference signal DMRS cyclic shift and orthogonal cover code OCC index field, an uplink index ULI field, a downlink assignment index DAI field, a channel state information CSI request field, an indicator field in a DCI format 3, or an indicator field in a DCI format 3A.

With reference to the fifth possible implementation of the fifth aspect, in a sixth possible implementation of the fifth aspect, the first field is further used to indicate a meaning of the original field in the DCI.

With reference to the sixth possible implementation of the fifth aspect, in a seventh possible implementation of the fifth aspect, the first subframe is a subframe of an unlicensed carrier.

According to a sixth aspect, an embodiment of the present invention provides user equipment, including a processor, a memory, a bus, and a receiver, where the processor, the memory, and the receiver are mutually connected by using the bus;

the receiver is configured to receive a first subframe and a second subframe that are adjacent to each other and that are sent by a network device, where the second subframe is received after the first subframe, the first subframe includes M orthogonal frequency division multiplexing OFDM symbols, the second subframe includes N OFDM symbols, M and N are positive integers, and M≤N; and the processor is configured to obtain a start location of the first subframe from a first field in downlink control information DCI of the second subframe, and process, starting from the start location of the first subframe, the first subframe, where the start location of the first subframe is a location or a range of a location of the first OFDM symbol of the first subframe sent by the network device to the user equipment.

With reference to the sixth aspect, in a first possible implementation of the sixth aspect, when the first subframe does not include DCI of the user equipment, the first field is used to indicate the start orthogonal frequency division multiplexing OFDM symbol of the first subframe that is sent first or a range of the start OFDM symbol of the first subframe that is sent first.

With reference to the sixth aspect or the first possible implementation of the sixth aspect, in a second possible implementation of the sixth aspect, all or some bits of the first field are used to indicate the start orthogonal frequency division multiplexing OFDM symbol of the first subframe that is sent first or the range of the start OFDM symbol of the first subframe that is sent first.

With reference to the sixth aspect or the first possible implementation of the sixth aspect, in a third possible implementation of the sixth aspect, all or some values of the first field are used to indicate the start orthogonal frequency division multiplexing OFDM symbol of the first subframe that is sent first or the range of the start OFDM symbol of the first subframe that is sent first.

With reference to any one of the sixth aspect to the third possible implementation of the sixth aspect, in a fourth possible implementation of the sixth aspect, the first field is a newly added field or an original field in the DCI.

With reference to any one of the sixth aspect to the fourth possible implementation of the sixth aspect, in a fifth possible implementation of the sixth aspect, when the first field is an original field in the DCI, the first field is a redundancy version RV field, a carrier indicator field CIF, a resource allocation RA field, a modulation and coding scheme MCS field, a downlink assignment index DAI field, a sounding reference signal SRS request field, a transmitted precoding matrix indicator TPMI acknowledgement field, a precoding matrix indicator PMI acknowledgement field, a downlink power offset field, a hybrid automatic repeat request HARQ process quantity field, a transport block to codeword swap flag field, a precoding information field, a transmit power control TPC field, a scrambling identity field, an antenna port, number of layers, and reference signal scrambling sequence field, a physical downlink shared channel PDSCH resource element RE mapping and quasi-co-location indicator field, a demodulation reference signal DMRS cyclic shift and orthogonal cover code OCC index field, an uplink index ULI field, a downlink assignment index DAI field, a channel state information CSI request field, an indicator field in a DCI format 3, or an indicator field in a DCI format 3A.

With reference to the fifth possible implementation of the sixth aspect, in a sixth possible implementation of the sixth aspect, the first field is further used to indicate a meaning of the original field in the DCI.

With reference to the sixth possible implementation of the sixth aspect, in a seventh possible implementation of the sixth aspect, the first subframe is a subframe of an unlicensed carrier.

According to a seventh aspect, an embodiment of the present invention provides a wireless network system, including a network device and user equipment, where the network device is the network device in the third aspect or any possible implementation of the third aspect, and the user equipment is the user equipment in the fourth aspect or any possible implementation of the fourth aspect; or the network device is the network device in the fifth aspect or any possible implementation of the fifth aspect, and the user equipment is the user equipment in the sixth aspect or any possible implementation of the sixth aspect.

According to the information transmission method, the device, and the system that are provided in the embodiments of the present invention, a network device obtains a start location of a first subframe, configures a first field in downlink control information DCI of a second subframe, and sends, to user equipment, the first subframe and the second subframe that are adjacent to each other. Because the network device sends the first field used to indicate a start OFDM symbol of the first subframe to the user equipment by adding the first field to the second subframe, the user equipment may determine the start OFDM symbol of the first subframe according to the first field, thereby resolving a problem that a receiving device has excessively large power consumption because the receiving device needs to continuously perform blind detection on a channel to determine a moment at which data transmission is started.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
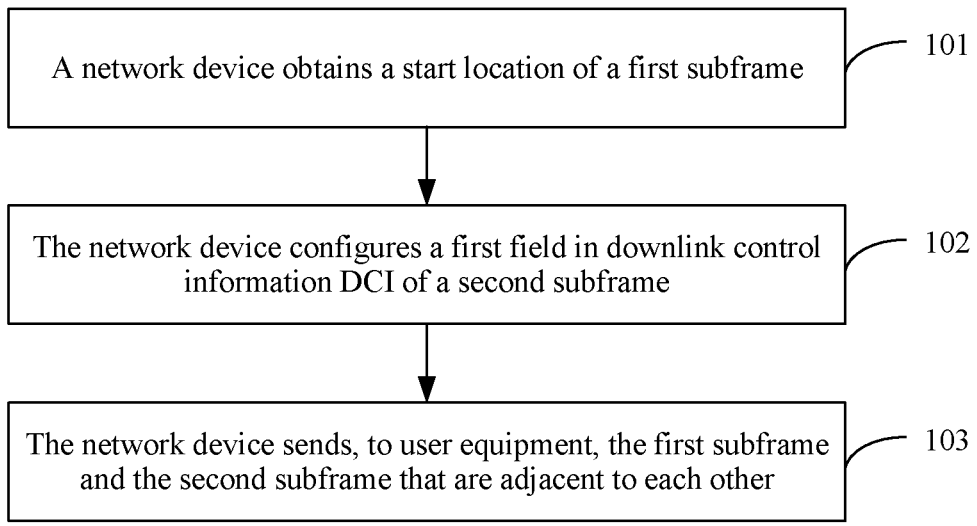
FIG. 1 is a schematic flowchart of an information transmission method according to an embodiment of the present invention.

An embodiment of the present invention provides an information transmission method, which is applied to a network device. Optionally. Referring to FIG. 1, the method includes the following steps.

101. The network device obtains a start location of a first subframe.

102. The network device configures a first field in Downlink Control Information DCI of a second subframe.

The first field is used to indicate the start location of the first subframe. The first field is included in the DCI (Downlink Control Information, downlink control information) of the second subframe.

103. The network device sends, to user equipment, the first subframe and the second subframe that are adjacent to each other.

The first subframe and the second subframe are two adjacent subframes in terms of time. The second subframe is sent after the first subframe. The first subframe includes M OFDM (Orthogonal Frequency Division Multiplexing, orthogonal frequency division multiplexing) symbols, and the second subframe includes N OFDM symbols, where M and N are positive integers. In addition, the start location of the first subframe is a location or a range of a location of the first OFDM symbol of the first subframe sent by the network device to the user equipment.

For example, a complete subframe includes 14 symbols, and the first subframe is transmitted starting from the fourth OFDM symbol, and then the first field indicates the fourth OFDM symbol. For another example, the first subframe is transmitted starting from a location between the fourth OFDM symbol and the seventh OFDM symbol, and then the first field indicates an interval from the fourth OFDM symbol to the seventh OFDM symbol. Optionally, four two-bit characters "00, 01, 10, and 11" may be used to respectively represent four OFDM symbol ranges 1-3, 4-7, 8-10, and 11-14. If the eighth OFDM symbol is the start OFDM symbol of the first subframe, "10" may be used as the first field. For another example, 14 OFDM symbols are represented by using four-bit binary character strings. If the eighth OFDM symbol is the start OFDM symbol of the first subframe, a corresponding binary character string "0100" may be used as the first field.

Preferably, when the first subframe does not include DCI of the user equipment, the first field is used to indicate the start orthogonal frequency division multiplexing OFDM symbol of the first subframe that is sent first or a range of the start OFDM symbol of the first subframe that is sent first. Optionally, the first subframe and the second subframe may be subframes of an unlicensed spectrum, or may be subframes of a licensed spectrum. The first field may further indicate an original meaning of an original field in the DCI.

Optionally, the first field may be a newly added field or an original field in the DCI. When the first field is an original field in the DCI, the first field may be an RV (Redundancy Version, redundancy version) field; or the first field may be included in a CIF (Carrier Indicator Field, carrier indicator field) of the second subframe.

Certainly, the first field may also be another field, for example, a resource allocation (Resource Allocation, RA) field, a modulation and coding scheme (Modulation and coding scheme, MCS) field, a downlink assignment index (Downlink Assignment Index, DAI) field, a sounding reference signal (Sounding Reference Signal, SRS) request field, a transmitted precoding matrix indicator (Transmitted Precoding Matrix Indicator, TPMI) acknowledgement field, a precoding matrix indictor (Precoding Matrix Indicator, PMI) acknowledgement field, a downlink power offset (Downlink power offset) field, a hybrid automatic repeat request (Hybrid Automatic Repeat Request, HARQ) process quantity field, a transport block to codeword swap flag (Transport block to codeword swap flag) field, a precoding information (Precoding information) field, a transmit power control (Transmit Power Control, TPC) field, a scrambling identity (Scrambling identity) field, an antenna port, number of layers, and reference signal scrambling sequence (antenna port, number of layers, and reference signal scrambling sequenc) field, a physical downlink shared channel resource element mapping and quasi-co-location indicator (Physical Downlink Shared Channel Resource element Mapping and Quasi-Co-Location Indicator) field, a demodulation reference signal cyclic shift and OCC index (Demodulation Reference Signal Cyclic Shift and Orthogonal Cover Code index) field, an uplink index (Up Link Index, ULI) field, a downlink assignment index (Downlink Assignment Index, DAI) field, a channel state information request (Channel State Information request) field, an indicator field in a DCI format 3, or an indicator field in a DCI format 3A.

The first field may be a part of an existing field, or may be an entire existing field. This may be set according to a specific situation, and is not limited in the present invention.

Optionally, the first field may exist in the DCI of the second subframe in the following three manners.

In a first manner, the first field may reuse an existing field. When the first subframe does not include DCI of the user equipment, the first field is used to indicate the start OFDM symbol of the first subframe or a range of the start OFDM symbol of the first subframe. When the first subframe includes the DCI of the user equipment, the first field retains an original meaning. Alternatively, when the first field is used to indicate the start OFDM symbol of the first subframe or a range of the start OFDM symbol of the first subframe, the first field is further used to indicate an original meaning of the original field. All or some bits of the first field may be used to indicate the start orthogonal frequency division multiplexing OFDM symbol of the first subframe that is sent first or the range of the start OFDM symbol of the first subframe that is sent first. For example, a two-bit character in an existing DCI field is used to indicate a transmission version number, and the two-bit character may be used as the first field. When the first subframe does not include the DCI of the user equipment, the two-bit character is used to indicate the start OFDM symbol of the first subframe or the range of the start OFDM symbol of the first subframe. Otherwise, the two-bit character indicates the transmission version number. Alternatively, when the two-bit character is used to indicate the start OFDM symbol of the first subframe or the range of the start OFDM symbol of the first subframe, the transmission version number is set to a fixed preset value.

In a second manner, all or some values of the first field may be used to indicate the start orthogonal frequency division multiplexing OFDM symbol of the first subframe that is sent first or a range of the start OFDM symbol of the first subframe that is sent first. Optionally, when a value of the first field falls within a preset interval, the first field is used to indicate the start OFDM symbol of the first subframe or the range of the start OFDM symbol of the first subframe. Preferably, the preset interval may be an interval of values with no specific meanings in the first field. For example, an existing CIF includes three bits, which may be used to indicate eight values 0 to 8. However, because an existing multi-carrier technology supports only five carriers, three values 5, 6, and 7 do not have specific meanings, and [5, 7] may be used as the preset interval. When a value of the CIF falls within the preset interval [5, 7], the CIF is used as the first field to indicate the start OFDM symbol of the first subframe.

Optionally, in a process of implementing the first manner and the second manner, one bit may be added to the DCI of the second subframe to indicate a meaning of the first field, that is, to indicate whether the first field retains the original meaning of the original field or indicates the start location of the first subframe or a range of the start location.

In a third manner, a new field is added to the DCI of the second subframe and is used as the first field.

Optionally, the present invention is applied to a scenario in which the network device preempts an unlicensed spectrum. Preferably, the present invention is applied to an LAA-LTE (Licensed Assisted Access Using Long Term Evolution, licensed assisted access using Long Term Evolution) system. The network device may occupy the unlicensed spectrum in two manners: an LBE (Load Based Equipment, load based equipment) mode and an FBE (Frame Based Equipment, frame based equipment) mode. When the network device uses a working mode of LBE, the network device needs to execute a CCA (Clear Channel Assessment, clear channel assessment) mechanism before occupying a channel resource to send data. Specifically, the network device randomly selects an integer N from 1 to q as an initial backoff value, where q may be referred to as a preset backoff threshold of the network device, and q is a preset positive integer greater than 1. During CCA detection, if the network device determines that the channel resource is idle, the initial backoff value N is subtracted by 1. During CCA detection, if the network device determines that the channel resource is occupied, the backoff value is kept unchanged. A backoff value determined after each time of CCA detection may be referred to as a current backoff value Nc. Only when the current backoff value Nc is subtracted to 0, the network device occupies the channel resource to transmit data. A process of progressively decreasing the initial backoff value by the network device according to the initial backoff value and by using CCA detection may be referred to as CCA backoff.

When the network device uses a working mode of FBE, the network device needs to execute a CCA backoff mechanism before occupying a channel resource to send data. Once a channel is found idle, the network device directly sends data.

Figure 2:
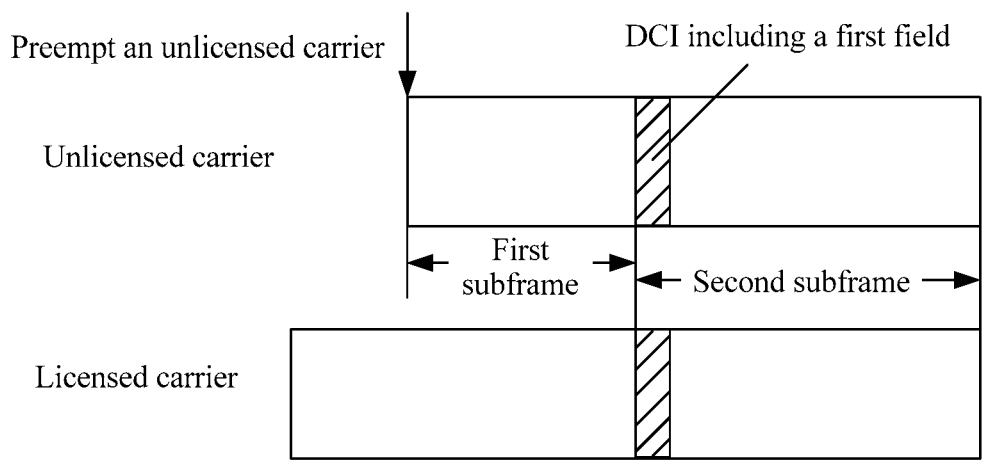
FIG. 2 is a schematic structural diagram of a subframe according to an embodiment of the present invention.

A time point at which the network device occupies a channel is random regardless of the FBE mode or the LBE mode used to access the channel. Therefore, a time at which a signal appears on an LAA-LTE carrier is also random. As a result, a time in which an LAA-LTE subframe occupies the channel may not be aligned with a time in which a subframe on a licensed carrier occupies the channel. Therefore, after the unlicensed spectrum is preempted, when data is being sent, the start OFDM symbol of the first subframe does not have a fixed location, that is, the start OFDM symbol of the first subframe in this embodiment of the present invention has a random location. As shown in FIG. 2, the first subframe is not a complete subframe. In this case, the first field is carried in the second subframe, and the first subframe and the second subframe are sent to the user equipment. The user equipment may determine the start OFDM symbol of the first subframe according to the first field carried in the second subframe. The first field may be sent on the unlicensed spectrum, or may be sent on a licensed spectrum. That is, the second subframe may be a subframe of the unlicensed spectrum, or may be a subframe of the licensed spectrum.

According to the information transmission method provided in this embodiment of the present invention, a network device obtains a start location of a first subframe, configures a first field in downlink control information DCI of a second subframe, and sends, to user equipment, the first subframe and the second subframe that are adjacent to each other. Because the network device sends the first field used to indicate a start OFDM symbol of the first subframe to the user equipment by adding the first field to the second subframe, the user equipment may determine the start OFDM symbol of the first subframe according to the first field, thereby resolving a problem that a receiving device has excessively large power consumption because the receiving device needs to continuously perform blind detection on a channel to determine a moment at which data transmission is started.

Figure 3:
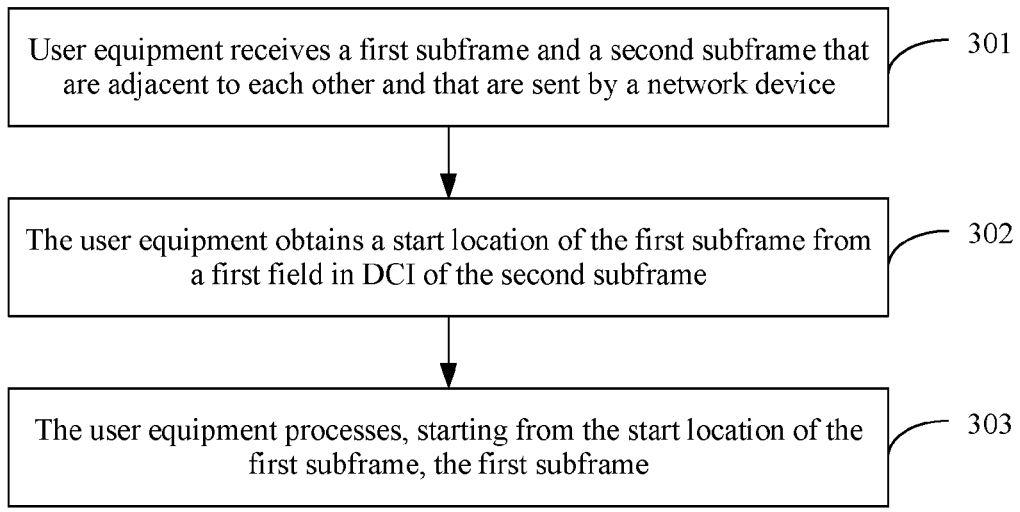
FIG. 3 is a schematic flowchart of an information transmission method according to another embodiment of the present invention.

With reference to the embodiment corresponding to FIG. 1, another embodiment of the present invention provides an information transmission method. The method is corresponding to a receive end of information transmission in the embodiment shown in FIG. 1, and is applied to user equipment. Referring to FIG. 3, the method includes the following steps.

301. The user equipment receives a first subframe and a second subframe that are adjacent to each other and that are sent by a network device.

The first subframe and the second subframe are two adjacent subframes in terms of time. The second subframe is received after the first subframe. The first subframe includes M OFDM symbols, and the second subframe includes N OFDM symbols, where M and N are positive integers, and M≤N. DCI of the second subframe includes a first field. The first field is used to indicate a start location of the first subframe. The start location of the first subframe is a location or a range of a location of the first OFDM symbol of the first subframe sent by the network device to the user equipment. Optionally, when the first subframe does not include DCI of the user equipment, the first field is used to indicate the start orthogonal frequency division multiplexing OFDM symbol of the first subframe that is sent first or a range of the start OFDM symbol of the first subframe that is sent first.

Optionally, the first field may be a redundancy version RV field of the second subframe or a carrier indicator field CIF of the second subframe. Certainly, the first field may also be another field. This is not limited in the present invention.

Preferably, the first subframe may be a subframe of an unlicensed spectrum, and the second subframe may be a subframe of a licensed spectrum or a subframe of an unlicensed spectrum.

In addition, optionally, with reference to the first manner in step 101 in the embodiment corresponding to FIG. 1, in a scenario in which the network device preempts an unlicensed spectrum, when the first field reuses an existing field, the user equipment may first make a judgment. If the first subframe does not include DCI of the user equipment, the start OFDM symbol of the first subframe needs to be determined. The first field indicates the start OFDM symbol of the first subframe or a range of the start OFDM symbol of the first subframe. The user equipment demodulates the first subframe according to the first field. Otherwise, the first field retains an original meaning of the original field. When indicating the start OFDM symbol of the first subframe or the range of the start OFDM symbol, the first field may further retain the original meaning of the original field.

Optionally, in the first field, all or some values of the first field may be used to indicate the start orthogonal frequency division multiplexing OFDM symbol of the first subframe that is sent first or a range of the start OFDM symbol of the first subframe that is sent first. Alternatively, all or some bits of the first field may be used to indicate the start orthogonal frequency division multiplexing OFDM symbol of the first subframe that is sent first or a range of the start OFDM symbol of the first subframe that is sent first.

302. The user equipment obtains a start location of the first subframe from a first field in DCI of the second subframe.

303. The user equipment processes, starting from the start location of the first subframe, the first subframe.

Optionally, demodulation is used as an example. When the first field indicates the start OFDM symbol of the first subframe, the user equipment may demodulate the first subframe according to the first field. When the first field indicates the range of the start OFDM symbol of the first subframe, the user equipment may determine the start OFDM symbol of the first subframe according to the range that is of the start OFDM symbol of the first subframe and that is indicated by the first field, and demodulate the first subframe. Preferably, the user equipment performs blind detection on the first subframe within the range of the start OFDM symbol that is indicated by the first field, so as to determine the start OFDM symbol of the first subframe. In this way, a range of the blind detection is relatively small, and power consumption of the user equipment is also reduced.

According to the information transmission method provided in this embodiment of the present invention, after receiving a first subframe and a second subframe, user equipment may determine a start OFDM symbol of the first subframe according to a first field included in the second subframe, and then process, starting from a start location of the first subframe, the first subframe, thereby resolving a problem that a receiving device has excessively large power consumption because without knowing a start OFDM symbol of a first subframe, the receiving device needs to continuously perform blind detection on a channel to determine a moment at which data transmission is started.

Figure 4:
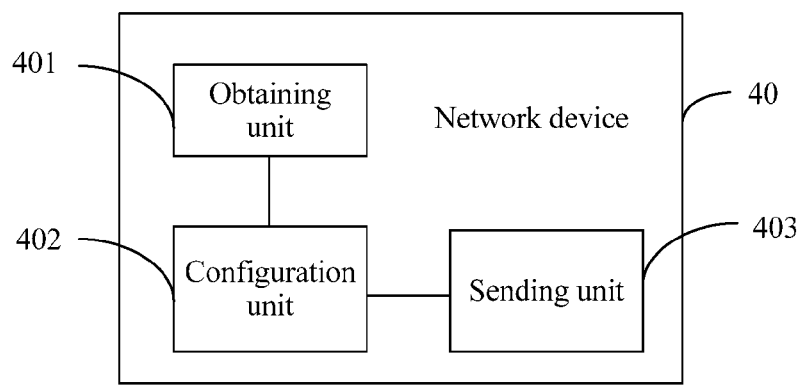
FIG. 4 is a schematic structural diagram of a network device according to an embodiment of the present invention.

Based on the embodiment corresponding to FIG. 1, an embodiment of the present invention provides a network device, which is used to execute the information transmission method described in the embodiment corresponding to FIG. 1. Referring to FIG. 4, the network device 40 includes an obtaining unit 401, a configuration unit 402, and a sending unit 403.

The obtaining unit 401 is configured to obtain a start location of a first subframe.

The configuration unit 402 is configured to configure a first field in downlink control information DCI of a second subframe. The first field is used to indicate the start location of the first subframe that is obtained by the obtaining unit 401.

The sending unit 403 is configured to send, to user equipment, the first subframe and the second subframe that are adjacent to each other. The second subframe is sent after the first subframe, the first subframe includes M orthogonal frequency division multiplexing OFDM symbols, the second subframe includes N OFDM symbols, M and N are positive integers, and M≤N.

The start location of the first subframe is a location or a range of a location of the first OFDM symbol of the first subframe sent by the network device to the user equipment.

Optionally, the first subframe is a subframe of an unlicensed carrier or a licensed carrier, and the second subframe is a subframe of an unlicensed carrier or a licensed carrier. In an application scenario, the first subframe is a subframe of an unlicensed carrier.

Optionally, when the first subframe does not include DCI of the user equipment, the first field is used to indicate the start orthogonal frequency division multiplexing OFDM symbol of the first subframe that is sent first or a range of the start OFDM symbol of the first subframe that is sent first.

Optionally, all or some bits of the first field are used to indicate the start orthogonal frequency division multiplexing OFDM symbol of the first subframe that is sent first or a range of the start OFDM symbol of the first subframe that is sent first. Alternatively, all or some values of the first field may be used to indicate the start orthogonal frequency division multiplexing OFDM symbol of the first subframe that is sent first or a range of the start OFDM symbol of the first subframe that is sent first.

Optionally, the first field is a newly added field or an original field in the DCI. When the first field is an original field in the DCI, the first field is further used to indicate a meaning of the original field in the DCI. In this case, the first field may be an RV (Redundancy Version, redundancy version) field; or the first field may be included in a CIF (Carrier Indicator Field, carrier indicator field) of the second subframe. The first field may also be another field, for example, a resource allocation (Resource Allocation, RA) field, a modulation and coding scheme (Modulation and coding scheme, MCS) field, a downlink assignment index (Downlink Assignment Index, DAI) field, a sounding reference signal (Sounding Reference Signal, SRS) request field, a transmitted precoding matrix indicator (Transmitted Precoding Matrix Indicator, TPMI) acknowledgement field, a precoding matrix indictor (Precoding Matrix Indicator, PMI) acknowledgement field, a downlink power offset (Downlink power offset) field, a hybrid automatic repeat request (Hybrid Automatic Repeat Request, HARQ) process quantity field, a transport block to codeword swap flag (Transport block to codeword swap flag) field, a precoding information (Precoding information) field, a transmit power control (Transmit Power Control, TPC) field, a scrambling identity (Scrambling identity) field, an antenna port, number of layers, and reference signal scrambling sequence (Antenna port, number of layers, and reference signal scrambling sequenc) field, a physical downlink shared channel resource element mapping and quasi-co-location indicator (Physical Downlink Shared Channel Resource element Mapping and Quasi-Co-Location Indicator) field, a demodulation reference signal cyclic shift and OCC index (Demodulation Reference Signal Cyclic Shift and Orthogonal Cover Code index) field, an uplink index (Up Link Index, ULI) field, a downlink assignment index (Downlink Assignment Index, DAI) field, a channel state information request (Channel State Information request) field, an indicator field in a DCI format 3, or an indicator field in a DCI format 3A.

Optionally, the first field is further used to indicate an original meaning of an original field in the DCI.

According to the network device provided in this embodiment of the present invention, the network device obtains a start location of a first subframe, configures a first field in downlink control information DCI of a second subframe, and sends, to user equipment, the first subframe and the second subframe that are adjacent to each other. Because the network device sends the first field used to indicate a start OFDM symbol of the first subframe to the user equipment by adding the first field to the second subframe, the user equipment may determine the start OFDM symbol of the first subframe according to the first field, thereby resolving a problem that a receiving device has excessively large power consumption because the receiving device needs to continuously perform blind detection on a channel to determine a moment at which data transmission is started.

Figure 5:
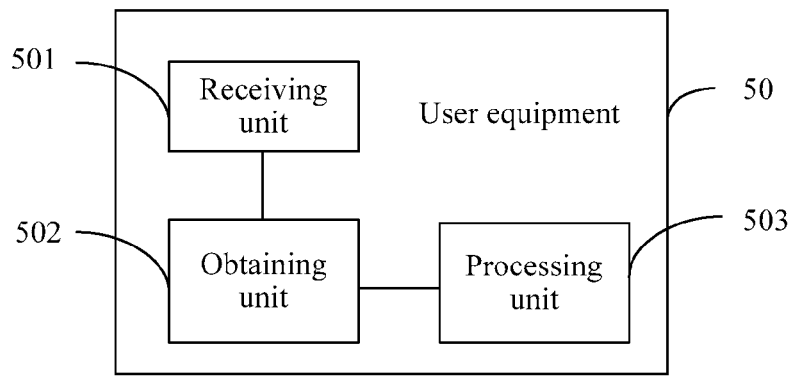
FIG. 5 is a schematic structural diagram of user equipment according to an embodiment of the present invention.

Based on the embodiment corresponding to FIG. 3, an embodiment of the present invention provides user equipment, which is used to execute the information transmission method described in the embodiment corresponding to FIG. 3. Referring to FIG. 5, the user equipment 50 includes a receiving unit 501, an obtaining unit 502, and a processing unit 503.

The receiving unit 501 is configured to receive a first subframe and a second subframe that are adjacent to each other and that are sent by a network device. The second subframe is received after the first subframe, the first subframe includes M orthogonal frequency division multiplexing OFDM symbols, the second subframe includes N OFDM symbols, M and N are positive integers, and M≤N.

The obtaining unit 502 is configured to obtain a start location of the first subframe from a first field in downlink control information DCI of the second subframe received by the receiving unit 501.

The processing unit 503 is configured to process, starting from the start location of the first subframe, the first subframe.

The start location of the first subframe is a location or a range of a location of the first OFDM symbol of the first subframe sent by the network device to the user equipment.

Optionally, the first subframe is a subframe of an unlicensed carrier or a licensed carrier, and the second subframe is a subframe of an unlicensed carrier or a licensed carrier. In an application scenario, the first subframe is a subframe of an unlicensed carrier.

Optionally, when the first subframe does not include DCI of the user equipment, the first field is used to indicate the start orthogonal frequency division multiplexing OFDM symbol of the first subframe that is sent first or a range of the start OFDM symbol of the first subframe that is sent first.

Optionally, all or some bits of the first field are used to indicate the start orthogonal frequency division multiplexing OFDM symbol of the first subframe that is sent first or a range of the start OFDM symbol of the first subframe that is sent first. Alternatively, all or some values of the first field may be used to indicate the start orthogonal frequency division multiplexing OFDM symbol of the first subframe that is sent first or a range of the start OFDM symbol of the first subframe that is sent first.

Optionally, the first field is a newly added field or an original field in the DCI. When the first field is an original field in the DCI, the first field is further used to indicate a meaning of the original field in the DCI. In this case, the first field may be an RV (Redundancy Version, redundancy version) field; or the first field may be included in a CIF (Carrier Indicator Field, carrier indicator field) of the second subframe. The first field may also be another field, for example, a resource allocation (Resource Allocation, RA) field, a modulation and coding scheme (Modulation and coding scheme, MCS) field, a downlink assignment index (Downlink Assignment Index, DAI) field, a sounding reference signal (Sounding Reference Signal, SRS) request field, a transmitted precoding matrix indicator (Transmitted Precoding Matrix Indicator, TPMI) acknowledgement field, a precoding matrix indictor (Precoding Matrix Indicator, PMI) acknowledgement field, a downlink power offset (Downlink power offset) field, a hybrid automatic repeat request (Hybrid Automatic Repeat Request, HARQ) process quantity field, a transport block to codeword swap flag (Transport block to codeword swap flag) field, a precoding information (Precoding information) field, a transmit power control (Transmit Power Control, TPC) field, a scrambling identity (Scrambling identity) field, an antenna port, number of layers, and reference signal scrambling sequence (Antenna port, number of layers, and reference signal scrambling sequenc) field, a physical downlink shared channel resource element mapping and quasi-co-location indicator (Physical Downlink Shared Channel Resource element Mapping and Quasi-Co-Location Indicator) field, a demodulation reference signal cyclic shift and OCC index (Demodulation Reference Signal Cyclic Shift and Orthogonal Cover Code index) field, an uplink index (Up Link Index, ULI) field, a downlink assignment index (Downlink Assignment Index, DAI) field, a channel state information request (Channel State Information request) field, an indicator field in a DCI format 3, or an indicator field in a DCI format 3A.

Optionally, the first field is further used to indicate an original meaning of an original field in the DCI.

According to the user equipment provided in this embodiment of the present invention, after receiving a first subframe and a second subframe, the user equipment may determine a start OFDM symbol of the first subframe according to a first field included in the second subframe, and then process, starting from a start location of the first subframe, the first subframe, thereby resolving a problem that a receiving device has excessively large power consumption because without knowing a start OFDM symbol of a first subframe, the receiving device needs to continuously perform blind detection on a channel to determine a moment at which data transmission is started.

Figure 6:
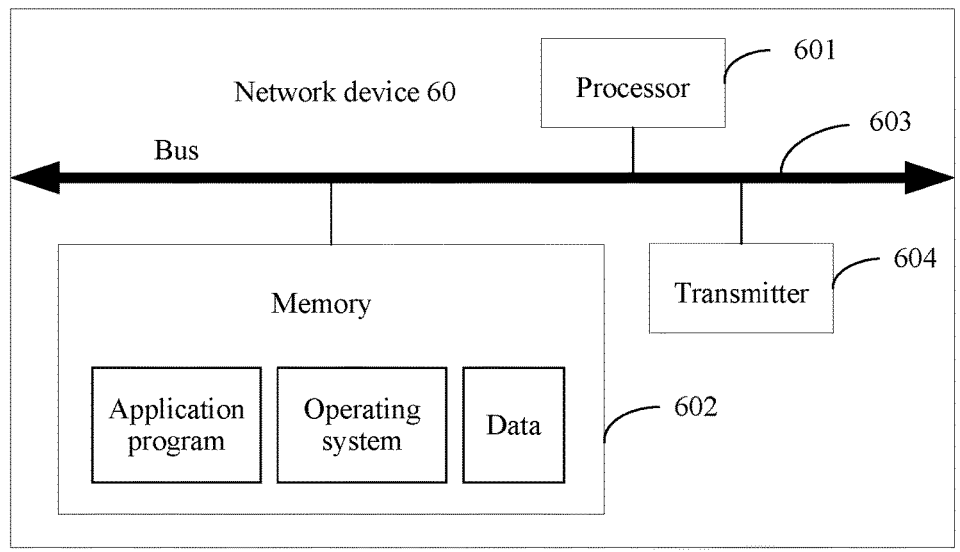
FIG. 6 is a schematic structural diagram of a network device according to another embodiment of the present invention.

Based on the embodiment corresponding to FIG. 1, another embodiment of the present invention provides a network device 60, which is used to execute the information transmission method described in the embodiment corresponding to FIG. 1. Referring to FIG. 6, the network device 60 includes at least one processor 601, a memory 602, a bus 603, and a transmitter 604. The at least one processor 601, the memory 602, and the transmitter 604 are connected and complete mutual communication by using the bus 603.

The bus 603 may be an ISA (Industry Standard Architecture, industry standard architecture) bus, a PCI (Peripheral Component Interconnect, peripheral component interconnect) bus, an EISA (Extended Industry Standard Architecture, extended industry standard architecture) bus, or the like. The bus 603 may be categorized into an address bus, a data bus, a control bus, and the like. For ease of illustration, only one bold line is used in FIG. 6 to represent the bus, which, however, does not mean that there is only one bus or only one type of bus.

The memory 602 is configured to store application program code used to execute the solutions of the present invention. The application program code used to execute the solutions of the present invention is stored in the memory, and is controlled and executed by the processor 601.

The memory may be a read-only memory ROM, a static storage device of another type that may store static information and an instruction, a random access memory RAM, or a dynamic storage device of another type that may store information and an instruction, or may be an electrically erasable programmable read-only memory EEPROM, a compact disc read-only memory CD-ROM or other compact disk storage, optical disc storage (including a compact disc, a laser disc, an optical disc, a digital versatile disc, and a blue-ray disc, and the like), a disk storage medium, another disk storage device, or any other medium that can be used to carry or store expected program code in a command or data structure form and can be accessed by a computer, which, however, is not limited herein. These memories are connected to the processor by using the bus.

The processor 601 may be a central processing unit 601 (Central Processing Unit, CPU for short), an application-specific integrated circuit (Application Specific Integrated Circuit, ASIC for short), or one or more integrated circuits configured to implement this embodiment of the present invention.

The processor 601 is configured to invoke the program code in the memory 602. In a possible implementation, when the application program code is executed by the processor 601, the following function is implemented.

The processor 601 is configured to obtain a start location of a first subframe, and configure a first field in downlink control information DCI of a second subframe, where the first field is used to indicate the start location of the first subframe.

The transmitter 604 is configured to send, to user equipment, the first subframe and the second subframe that are adjacent to each other. The second subframe is sent after the first subframe, the first subframe includes M orthogonal frequency division multiplexing OFDM symbols, the second subframe includes N OFDM symbols, M and N are positive integers, and M≤N.

The start location of the first subframe is a location or a range of a location of the first OFDM symbol of the first subframe sent by the network device to the user equipment.

Optionally, the first subframe is a subframe of an unlicensed carrier or a licensed carrier, and the second subframe is a subframe of an unlicensed carrier or a licensed carrier. In an application scenario, the first subframe is a subframe of an unlicensed carrier.

Optionally, when the first subframe does not include DCI of the user equipment, the first field is used to indicate the start orthogonal frequency division multiplexing OFDM symbol of the first subframe that is sent first or a range of the start OFDM symbol of the first subframe that is sent first.

Optionally, all or some bits of the first field are used to indicate the start orthogonal frequency division multiplexing OFDM symbol of the first subframe that is sent first or a range of the start OFDM symbol of the first subframe that is sent first. Alternatively, all or some values of the first field may be used to indicate the start orthogonal frequency division multiplexing OFDM symbol of the first subframe that is sent first or a range of the start OFDM symbol of the first subframe that is sent first.

Optionally, the first field is a newly added field or an original field in the DCI. When the first field is an original field in the DCI, the first field is further used to indicate a meaning of the original field in the DCI. In this case, the first field may be an RV (Redundancy Version, redundancy version) field; or the first field may be included in a CIF (Carrier Indicator Field, carrier indicator field) of the second subframe. The first field may also be another field, for example, a resource allocation (Resource Allocation, RA) field, a modulation and coding scheme (Modulation and coding scheme, MCS) field, a downlink assignment index (Downlink Assignment Index, DAI) field, a sounding reference signal (Sounding Reference Signal, SRS) request field, a transmitted precoding matrix indicator (Transmitted Precoding Matrix Indicator, TPMI) acknowledgement field, a precoding matrix indictor (Precoding Matrix Indicator, PMI) acknowledgement field, a downlink power offset (Downlink power offset) field, a hybrid automatic repeat request (Hybrid Automatic Repeat Request, HARQ) process quantity field, a transport block to codeword swap flag (Transport block to codeword swap flag) field, a precoding information (Precoding information) field, a transmit power control (Transmit Power Control, TPC) field, a scrambling identity (Scrambling identity) field, an antenna port, number of layers, and reference signal scrambling sequence (Antenna port, number of layers, and reference signal scrambling sequenc) field, a physical downlink shared channel resource element mapping and quasi-co-location indicator (Physical Downlink Shared Channel Resource element Mapping and Quasi-Co-Location Indicator) field, a demodulation reference signal cyclic shift and OCC index (Demodulation Reference Signal Cyclic Shift and Orthogonal Cover Code index) field, an uplink index (Up Link Index, ULI) field, a downlink assignment index (Downlink Assignment Index, DAI) field, a channel state information request (Channel State Information request) field, an indicator field in a DCI format 3, or an indicator field in a DCI format 3A.

Optionally, the first field is further used to indicate an original meaning of an original field in the DCI.

According to the network device provided in this embodiment of the present invention, the network device obtains a start location of a first subframe, configures a first field in downlink control information DCI of a second subframe, and sends, to user equipment, the first subframe and the second subframe that are adjacent to each other. Because the network device sends the first field used to indicate a start OFDM symbol of the first subframe to the user equipment by adding the first field to the second subframe, the user equipment may determine the start OFDM symbol of the first subframe according to the first field, thereby resolving a problem that a receiving device has excessively large power consumption because the receiving device needs to continuously perform blind detection on a channel to determine a moment at which data transmission is started.

Figure 7:
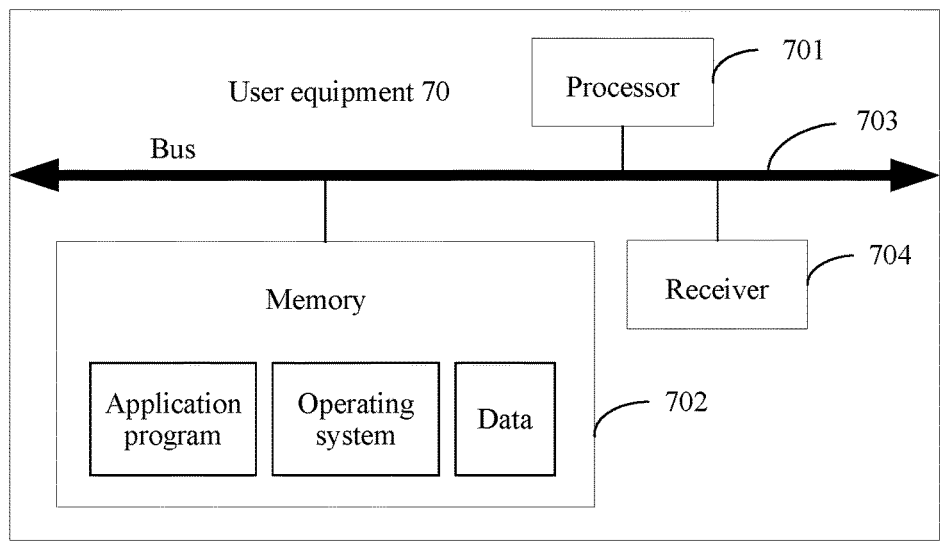
FIG. 7 is a schematic structural diagram of user equipment according to another embodiment of the present invention.

Based on the embodiment corresponding to FIG. 3, another embodiment of the present invention provides user equipment 70, which is used to execute the information transmission method described in the embodiment corresponding to FIG. 3. Referring to FIG. 7, the user equipment 70 includes at least one processor 701, a memory 702, a bus 703, and a receiver 704. The at least one processor 701, the memory 702, and the receiver 704 are connected and complete mutual communication by using the bus 703.

The bus 703 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 703 may be categorized into an address bus, a data bus, a control bus, and the like. For ease of illustration, only one bold line is used in FIG. 7 to represent the bus, which, however, does not mean that there is only one bus or only one type of bus.

The memory 702 is configured to store application program code used to execute the solutions of the present invention. The application program code used to execute the solutions of the present invention is stored in the memory, and is controlled and executed by the processor 701.

The memory may be a read-only memory ROM, a static storage device of another type that may store static information and an instruction, a random access memory RAM, or a dynamic storage device of another type that may store information and an instruction, or may be an electrically erasable programmable read-only memory EEPROM, a compact disc read-only memory CD-ROM or other compact disk storage, optical disc storage (including a compact disc, a laser disc, an optical disc, a digital versatile disc, and a blue-ray disc, and the like), a disk storage medium, another disk storage device, or any other medium that can be used to carry or store expected program code in a command or data structure form and can be accessed by a computer, which, however, is not limited herein. These memories are connected to the processor by using the bus.

The processor 701 may be a central processing unit 701 (Central Processing Unit, CPU for short), an application-specific integrated circuit (Application Specific Integrated Circuit, ASIC for short), or one or more integrated circuits configured to implement this embodiment of the present invention.

The processor 701 is configured to invoke the program code in the memory 702. In a possible implementation, when the application program code is executed by the processor 701, the following function is implemented.

The receiver 704 is configured to receive a first subframe and a second subframe that are adjacent to each other and that are sent by a network device. The second subframe is received after the first subframe, the first subframe includes M orthogonal frequency division multiplexing OFDM symbols, the second subframe includes N OFDM symbols, M and N are positive integers, and M≤N.

The processor 701 is configured to obtain a start location of the first subframe from a first field in downlink control information DCI of the second subframe, and process, starting from the start location of the first subframe, the first subframe.

The start location of the first subframe is a location or a range of a location of the first OFDM symbol of the first subframe sent by the network device to the user equipment.

Optionally, the first subframe is a subframe of an unlicensed carrier or a licensed carrier, and the second subframe is a subframe of an unlicensed carrier or a licensed carrier. In an application scenario, the first subframe is a subframe of an unlicensed carrier.

Optionally, when the first subframe does not include DCI of the user equipment, the first field is used to indicate the start orthogonal frequency division multiplexing OFDM symbol of the first subframe that is sent first or a range of the start OFDM symbol of the first subframe that is sent first.

Optionally, all or some bits of the first field are used to indicate the start orthogonal frequency division multiplexing OFDM symbol of the first subframe that is sent first or a range of the start OFDM symbol of the first subframe that is sent first. Alternatively, all or some values of the first field may be used to indicate the start orthogonal frequency division multiplexing OFDM symbol of the first subframe that is sent first or a range of the start OFDM symbol of the first subframe that is sent first.

Optionally, the first field is a newly added field or an original field in the DCI. When the first field is an original field in the DCI, the first field is further used to indicate a meaning of the original field in the DCI. In this case, the first field may be an RV (Redundancy Version, redundancy version) field; or the first field may be included in a CIF (Carrier Indicator Field, carrier indicator field) of the second subframe. The first field may also be another field, for example, a resource allocation (Resource Allocation, RA) field, a modulation and coding scheme (Modulation and coding scheme, MCS) field, a downlink assignment index (Downlink Assignment Index, DAI) field, a sounding reference signal (Sounding Reference Signal, SRS) request field, a transmitted precoding matrix indicator (Transmitted Precoding Matrix Indicator, TPMI) acknowledgement field, a precoding matrix indictor (Precoding Matrix Indicator, PMI) acknowledgement field, a downlink power offset (Downlink power offset) field, a hybrid automatic repeat request (Hybrid Automatic Repeat Request, HARQ) process quantity field, a transport block to codeword swap flag (Transport block to codeword swap flag) field, a precoding information (Precoding information) field, a transmit power control (Transmit Power Control, TPC) field, a scrambling identity (Scrambling identity) field, an antenna port, number of layers, and reference signal scrambling sequence (Antenna port, number of layers, and reference signal scrambling sequenc) field, a physical downlink shared channel resource element mapping and quasi-co-location indicator (Physical Downlink Shared Channel Resource element Mapping and Quasi-Co-Location Indicator) field, a demodulation reference signal cyclic shift and OCC index (Demodulation Reference Signal Cyclic Shift and Orthogonal Cover Code index) field, an uplink index (Up Link Index, ULI) field, a downlink assignment index (Downlink Assignment Index, DAI) field, a channel state information request (Channel State Information request) field, an indicator field in a DCI format 3, or an indicator field in a DCI format 3A.

Optionally, the first field is further used to indicate an original meaning of an original field in the DCI.

According to the user equipment provided in this embodiment of the present invention, after receiving a first subframe and a second subframe, the user equipment may determine a start OFDM symbol of the first subframe according to a first field included in the second subframe, and then process, starting from a start location of the first subframe, the first subframe, thereby resolving a problem that a receiving device has excessively large power consumption because without knowing a start OFDM symbol of a first subframe, the receiving device needs to continuously perform blind detection on a channel to determine a moment at which data transmission is started.

Figure 8:
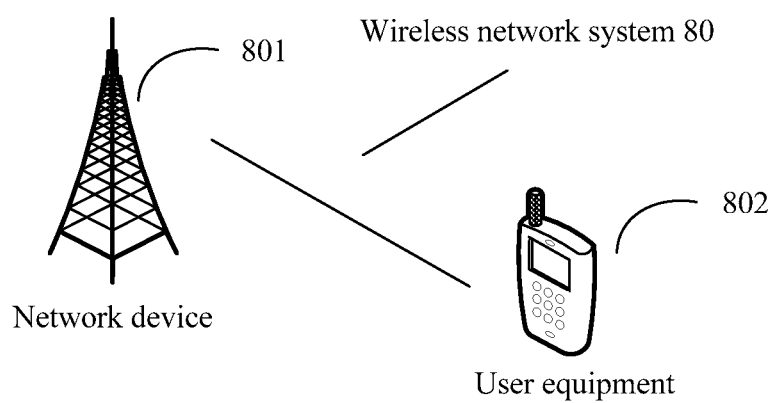
FIG. 8 is a schematic structural diagram of a wireless network system according to an embodiment of the present invention.

Based on the embodiments corresponding to FIG. 1 and FIG. 3, an embodiment of the present invention provides a wireless network system, which is used to implement the information transmission methods described in the embodiments corresponding to FIG. 1 and FIG. 3. Referring to FIG. 8, the wireless network system 80 includes a network device 801 and user equipment 802.

The network device 801 is the network device described in the embodiment corresponding to FIG. 4, and the user equipment 802 is the user equipment described in the embodiment corresponding to FIG. 5.

Alternatively, the network device 801 is the network device described in the embodiment corresponding to FIG. 6, and the user equipment 802 is the user equipment described in the embodiment corresponding to FIG. 7.

According to the wireless network system provided in this embodiment of the present invention, a network device obtains a start location of a first subframe, configures a first field in downlink control information DCI of a second subframe, and sends, to user equipment, the first subframe and the second subframe that are adjacent to each other. Because the network device sends the first field used to indicate a start OFDM symbol of the first subframe to the user equipment by adding the first field to the second subframe, the user equipment may determine the start OFDM symbol of the first subframe according to the first field, thereby resolving a problem that a receiving device has excessively large power consumption because the receiving device needs to continuously perform blind detection on a channel to determine a moment at which data transmission is started.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM (Random Access Memory, random access memory), a ROM (Read-Only Memory, read-only memory), an EEPROM (Electrically Erasable Programmable Read-Only Memory, electrically erasable programmable read-only memory), a CD-ROM (Compact Disc Read-Only Memory, compact disc read-only memory) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line, digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present invention includes a CD (Compact Disc, compact disc), a laser disc, an optical disc, a DVD disc (Digital Versatile Disc, digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
obtaining, by a network device, a start location of a first subframe;
configuring, by the network device, a first field in downlink control information (DCI) of a second subframe, wherein the first field is used to indicate the start location of the first subframe; and
sending, by the network device to a user equipment, the first subframe and the second subframe, wherein the first subframe and the second subframe are adjacent to each other, wherein the second subframe is sent after the first subframe, the first subframe comprises M orthogonal frequency division multiplexing (OFDM) symbols, the second subframe comprises N OFDM symbols, M and N are positive integers, and M≤N, wherein
the start location of the first subframe is a location or a range of a location of a first OFDM symbol of the first subframe sent by the network device to the user equipment, and
wherein when the first subframe does not comprise DCI of the user equipment, the first field is used to indicate the start location of the first subframe.

2. An information transmission method, comprising:
obtaining, by a network device, a start location of a first subframe;
configuring, by the network device, a first field in downlink control information (DCI) of a second subframe, wherein the first field is used to indicate the start location of the first subframe; and
sending, by the network device to a user equipment, the first subframe and the second subframe, wherein the first subframe and the second subframe are adjacent to each other, wherein the second subframe is sent after the first subframe, the first subframe comprises M orthogonal frequency division multiplexing (OFDM) symbols, the second subframe comprises N OFDM symbols, M and N are positive integers, and M≤N, wherein the start location of the first subframe is a location or a range of a location of a first OFDM symbol of the first subframe sent by the network device to the user equipment, wherein the first field is a newly added field or an original field in the DCI.

3. The method according to claim 2, wherein when the first field is the original field in the DCI, the first field is a redundancy version (RV) field, a carrier indicator field (CIF), a resource allocation (RA) field, a modulation and coding scheme (MCS) field, a downlink assignment index (DAI) field, a sounding reference signal (SRS) request field, a transmitted precoding matrix indicator (TPMI) acknowledgement field, a precoding matrix indicator (PMI) acknowledgement field, a downlink power offset field, a hybrid automatic repeat request (HARQ) process quantity field, a transport block to codeword swap flag field, a precoding information field, a transmit power control (TPC) field, a scrambling identity field, an antenna port, a number of layers, a reference signal scrambling sequence field, a physical downlink shared channel (PDSCH) resource element (RE) mapping and quasi-co-location indicator field, a demodulation reference signal (DMRS) cyclic shift and orthogonal cover code (OCC) index field, an uplink index (ULI) field, a downlink assignment index (DAI) field, a channel state information (CSI) request field, an indicator field in a DCI format 3A, or an indicator field in a DCI format 3.

4. The method according to claim 3, wherein the first field is further used to indicate an original meaning of the original field in the DCI.

5. An information transmission method, comprising:
receiving, by a user equipment, a first subframe and a second subframe that are adjacent to each other and that are sent by a network device, wherein the second subframe is received after the first subframe, the first subframe comprises M orthogonal frequency division multiplexing (OFDM) symbols, the second subframe comprises N OFDM symbols, M and N are positive integers, and M≤N;
obtaining, by the user equipment, a start location of the first subframe from a first field in downlink control information (DCI) of the second subframe; and
processing, by the user equipment, starting from the start location of the first subframe, the first subframe, wherein
the start location of the first subframe is a location or a range of a location of the first OFDM symbol of the first subframe sent by the network device to the user equipment, wherein
the first field is a newly added field or an original field in the DCI.

6. The method according to claim 5, wherein
when the first field is the original field in the DCI, the first field is a redundancy version (RV) field, a carrier indicator field (CIF), a resource allocation (RA) field, a modulation and coding scheme (MCS) field, a downlink assignment index (DAI) field, a sounding reference signal (SRS) request field, a transmitted precoding matrix indicator (TPMI) acknowledgement field, a precoding matrix indicator (PMI) acknowledgement field, a downlink power offset field, a hybrid automatic repeat request (HARQ) process quantity field, a transport block to codeword swap flag field, a precoding information field, a transmit power control (TPC) field, a scrambling identity field, an antenna port, a number of layers, a reference signal scrambling sequence field, a physical downlink shared channel (PDSCH) resource element (RE) mapping and quasi-co-location indicator field, a demodulation reference signal (DMRS) cyclic shift and orthogonal cover code (OCC) index field, an uplink index (ULI) field, a downlink assignment index (DAI) field, a channel state information (CSI) request field, an indicator field in a DCI format 3A, or an indicator field in a DCI format 3.

7. The method according to claim 6, wherein the first field is further used to indicate an original meaning of the original field in the DCI.

8. A user equipment, comprising a processor, a memory, a bus, and a receiver, wherein the processor, the memory, and the receiver are mutually connected by the bus;
the receiver is configured to receive a first subframe and a second subframe that are adjacent to each other and that are sent by a network device, wherein the second subframe is received after the first subframe, the first subframe comprises M orthogonal frequency division multiplexing (OFDM) symbols, the second subframe comprises N OFDM symbols, M and N are positive integers, and M≤N; and
the processor is configured to obtain a start location of the first subframe from a first field in downlink control information (DCI) of the second subframe, wherein the first field is a newly added field or an original field in the DCI, and to process, starting from the start location of the first subframe, the first subframe, wherein
the start location of the first subframe is a location or a range of a location of the first OFDM symbol of the first subframe sent by the network device to the user equipment.

9. A wireless network system, comprising a network device and a user equipment, wherein
the network device comprises a processor, a memory, a bus, and a transmitter, wherein the processor, the memory, and the transmitter are mutually connected by the bus;
the processor is configured to obtain a start location of a first subframe, and configure a first field in downlink control information (DCI) of a second subframe, wherein the first field is a newly added field or an original field in the DCI, wherein the first field is used to indicate the start location of the first subframe; and
the transmitter is configured to send, to the user equipment, the first subframe and the second subframe, wherein the first subframe and the second subframe are adjacent to each other, wherein the second subframe is sent after the first subframe, the first subframe comprises M orthogonal frequency division multiplexing (OFDM) symbols, the second subframe comprises N OFDM symbols, M and N are positive integers, and M≤N, wherein
the user equipment comprises a processor, a memory, a bus, and a receiver, wherein the processor, the memory, and the receiver of the user equipment are mutually connected by the bus of the user equipment;
the receiver of the user equipment is configured to receive the first subframe and the second subframe that are adjacent to each other and that are sent by the network device, wherein the second subframe is received after the first subframe, the first subframe comprises M OFDM symbols, the second subframe comprises N OFDM symbols, M and N are positive integers, and M≤N; and
the processor of the user equipment is configured to obtain a start location of the first subframe from a first field in the DCI of the second subframe, and process, starting from the start location of the first subframe, the first subframe, wherein
the start location of the first subframe is a location or a range of a location of the first OFDM symbol of the first subframe sent by the network device to the user equipment.

* * * * *